United States Patent
Lin

(10) Patent No.: US 10,451,907 B2
(45) Date of Patent: Oct. 22, 2019

(54) FRAME STRUCTURE FOR A DISPLAY DEVICE FRAME

(71) Applicants: GAUSS DESIGN INC, New Taipei (TW); Pei-Ying Wang, New Taipei (TW); Po-Chi Fang, New Taipei (TW); Meng-Han Liu, New Taipei (TW); Chih-Chieh Lin, New Taipei (TW)

(72) Inventor: Chih-Chieh Lin, New Taipei (TW)

(73) Assignees: Gauss Design Inc., New Taipei (TW); Pei-Ying Wang, New Taipei (TW); Po-Chi Fang, New Taipei (TW); Meng-Han Liu, New Taipei (TW); Chih-Chieh Lin, New Taipei (TW)

( * ) Notice: Subject to any disclaimer, the term of this patent is extended or adjusted under 35 U.S.C. 154(b) by 45 days.

(21) Appl. No.: 15/613,443

(22) Filed: Jun. 5, 2017

(65) Prior Publication Data
US 2018/0348576 A1 Dec. 6, 2018

(51) Int. Cl.
*G02F 1/1333* (2006.01)

(52) U.S. Cl.
CPC ............... *G02F 1/133308* (2013.01); *G02F 2001/133314* (2013.01)

(58) Field of Classification Search
CPC ......... G02F 1/133308; G02F 1/133608; G02F 1/13452; G02F 2001/133314; G02F 2001/133328; G02F 2001/133317; G02F 2001/13332; G07F 17/3211
See application file for complete search history.

(56) References Cited

U.S. PATENT DOCUMENTS

| | | | | |
|---|---|---|---|---|
| 2008/0007959 | A1* | 1/2008 | Chen | G02F 1/1336 362/457 |
| 2008/0130211 | A1* | 6/2008 | Takuma | G06F 1/1616 361/679.01 |
| 2012/0212973 | A1* | 8/2012 | Lin | G02F 1/133615 362/602 |
| 2012/0242926 | A1* | 9/2012 | Hsu | G02F 1/133308 349/58 |
| 2013/0002976 | A1* | 1/2013 | Notermans | F21S 8/00 349/58 |
| 2014/0375900 | A1* | 12/2014 | Ozeki | G02B 6/0033 348/794 |
| 2015/0177553 | A1* | 6/2015 | Yu | G02F 1/133308 349/58 |

FOREIGN PATENT DOCUMENTS

JP   2001022291 A   *   1/2001   ............... G09F 9/00

* cited by examiner

*Primary Examiner* — Huyen L Ngo
(74) *Attorney, Agent, or Firm* — Jackson IPG PLLC; Demian K. Jackson

(57) ABSTRACT

The present invention discloses a frame structure for a display device including a metallic back panel having a lateral edge extended from a side of the metallic back panel and a plastic outer frame having two clip parts. The lateral edge is having two side surfaces. The lateral edge is formed integrally with the metallic back panel. An included angle is formed between an inner side of the metallic back panel and an inner side of the lateral edge. A bended corner is formed between an outer side of the metallic back panel and an outer side of the lateral edge. The bended corner is in a shape of an arc. The two clip parts are in a clipping state to clip the two side surfaces of the lateral edge. The plastic outer frame completely encloses the two side surfaces, the included angle and the bended corner by injection molding.

9 Claims, 14 Drawing Sheets

FRAME STRUCTURE FOR A DISPLAY DEVICE FRAME

BACKGROUND OF THE INVENTION a) Field of the Invention

The present invention relates to a display device frame, and more particularly to a display device frame which is simple in structure and space.

b) Description of the Prior Art

For a frame of an existing liquid crystal display device, clamping parts are disposed on sides of a front frame to engage with the corresponding clamping parts on the sides of a back light module. However, the design of the clamping parts will inevitably increase the width of the liquid crystal display device, and in order to cover the breaches caused by the clamping parts for beautifying, an outer shell will be needed to enclose the front frame. Nevertheless, in the existing market trends, the liquid crystal display device is mostly designed to have no frame or have a narrow frame.

Referring to FIG. 1 and FIG. 2 at a same time, it shows a three-dimensional view and a planar view of a frame of a conventional liquid crystal display device. The liquid crystal display device is formed by assembling a panel A with a plastic outer frame B. The panel A is constituted by a front frame A1, a back light module A4, a buffer material A2 and a metallic back panel A3. Finally, the plastic outer frame B is combined with the panel A by locking with screws or by clamping. As the panel A and the display devices to be applied are independent designs, a more complicated method is used in assembling, such as locking with screws, clamping with clips or adhering with gum. However, under the demands and trends of compact designs, the assembly procedure of the frame of the conventional liquid crystal display device is more complicated and the cost will be higher. In addition, the prepared liquid crystal display device is heavier. Therefore, how to use an innovative hardware design to provide a liquid crystal display device frame which is simple in structure and space and to achieve effectively the trends and advantages of thinning a large liquid crystal display device is an issue to be overcome and solved by developers of the liquid crystal display device frame and related researchers.

SUMMARY OF THE INVENTION

The primary object of the present invention is to provide a display device frame which is simple in structure and space. The frame is manufactured primarily by plastic injection molding, wherein a plastic material is enclosed on a side of a metallic back panel to form a plastic outer frame. The method of combining plastic with metal is used effectively to form a large display device, which removes the front frame in the conventional large display device frame and uses effectively a metallic material to support, such that the plastic material can enclose the periphery or a part of the large display device to achieve the trends and advantages of thinning the large display device. Furthermore, by using the insert molding method in which plastic encloses a metal part, no extra work procedures will be needed, which saves the assembling cost of the large display device, and actually achieves the benefits of saving the assembling procedure, cost and time of the large display device to realize the advantages of lightness, simpleness and thinning of the large display device.

According to the object of the present invention, a display device frame is disclosed, including at least a metallic back panel and a plastic outer frame. A side of the metallic back panel is extended with a lateral edge, the metallic back panel is formed integrally with the lateral edge, and an included angle is formed between an inner side of the metallic back panel and an inner side of the lateral edge. The lateral edge is provided with two side surfaces; whereas, the plastic outer frame is provided with two clip parts and encloses the lateral edge, with that the two clip parts are in a clipping state to clip the two side surfaces.

In accordance with the abovementioned display device frame, the included angle is an obtuse angle, a right angle or an acute angle.

In accordance with the abovementioned display device frame, the included angle is a right angle.

In accordance with the abovementioned display device frame, the plastic outer frame completely encloses the two side surfaces of the lateral edge.

In accordance with the abovementioned display device frame, the plastic outer frame encloses the lateral edge by injection molding.

In accordance with the abovementioned display device frame, the plastic outer frame encloses completely the two side surfaces of the lateral edge, and encloses the lateral edge by injection molding.

In accordance with the abovementioned display device frame, an outer side of the metallic back panel and an outer side of the lateral edge form a bended corner. A metallic back panel hole is located on the metallic back panel in adjacent to the bended corner or at the bended corner; whereas, the plastic outer frame penetrates and fills the metallic back panel hole.

In accordance with the abovementioned display device frame, the lateral edge is provided with a lateral edge hole, whereas the plastic outer frame penetrates and fills the lateral edge hole.

In accordance with the abovementioned display device frame, a bottom of the lateral edge is extended outward with a flank.

In accordance with the abovementioned display device frame, the flank is provided with a flank hole, whereas the plastic outer frame penetrates and fills the flank hole.

In accordance with the abovementioned display device frame, the lateral edge includes a groove, and the plastic outer frame fills the groove.

In accordance with the abovementioned display device frame, a bottom of the groove is opened with a groove hole, whereas the plastic outer frame penetrates and fills the groove hole.

Accordingly, by making the display device frame by plastic injection molding, a right angle side of the metallic back panel is enclosed by the plastic outer frame, and the method of combining plastic with metal is used effectively to form a large display device, which removes the front frame in the conventional large display device frame and uses effectively a metallic material to support, such that the plastic material can enclose the periphery or a part of the large display device to achieve the trends and advantages of thinning the large display device. Furthermore, by using the insert molding method in which plastic encloses a metal part, no extra work procedures will be needed, which saves the assembling cost of the large display device, and actually achieves the benefits of saving the assembling procedure, cost and time of the large display device to realize the advantages of lightness, simpleness and thinning of the large display device.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 3:
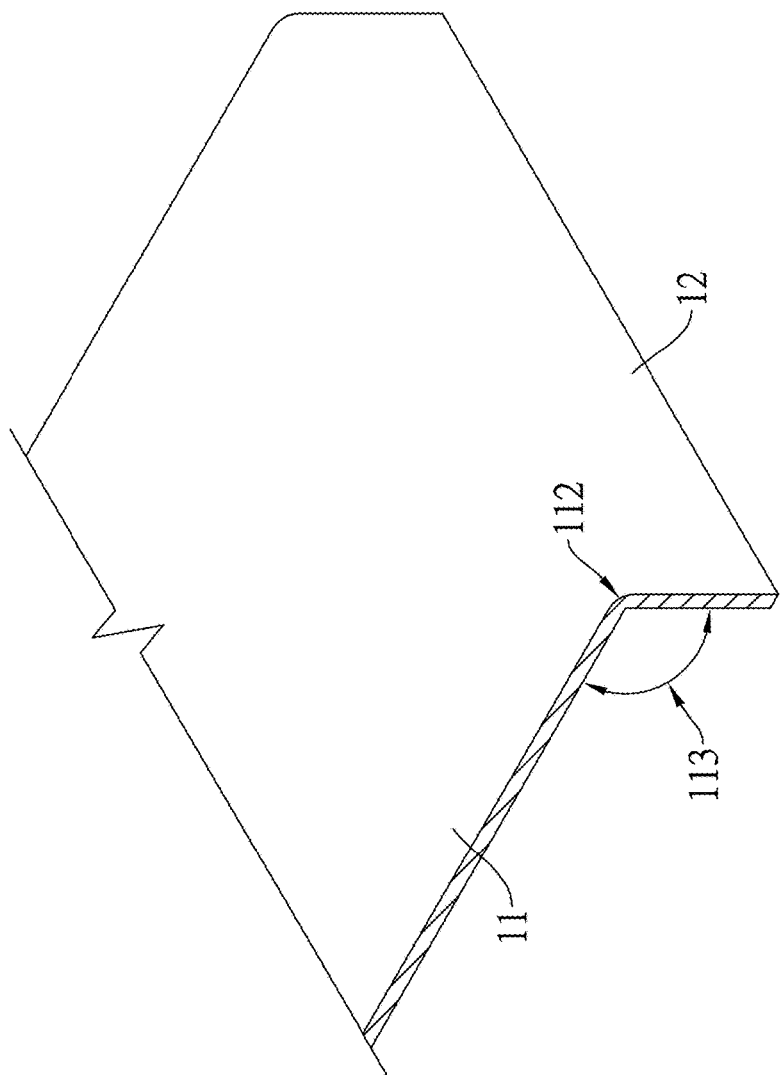
FIG. 3 shows a three-dimensional view of one side of a metallic back panel in accordance with a first preferred embodiment of a display device frame of the present invention.
Figure 4:
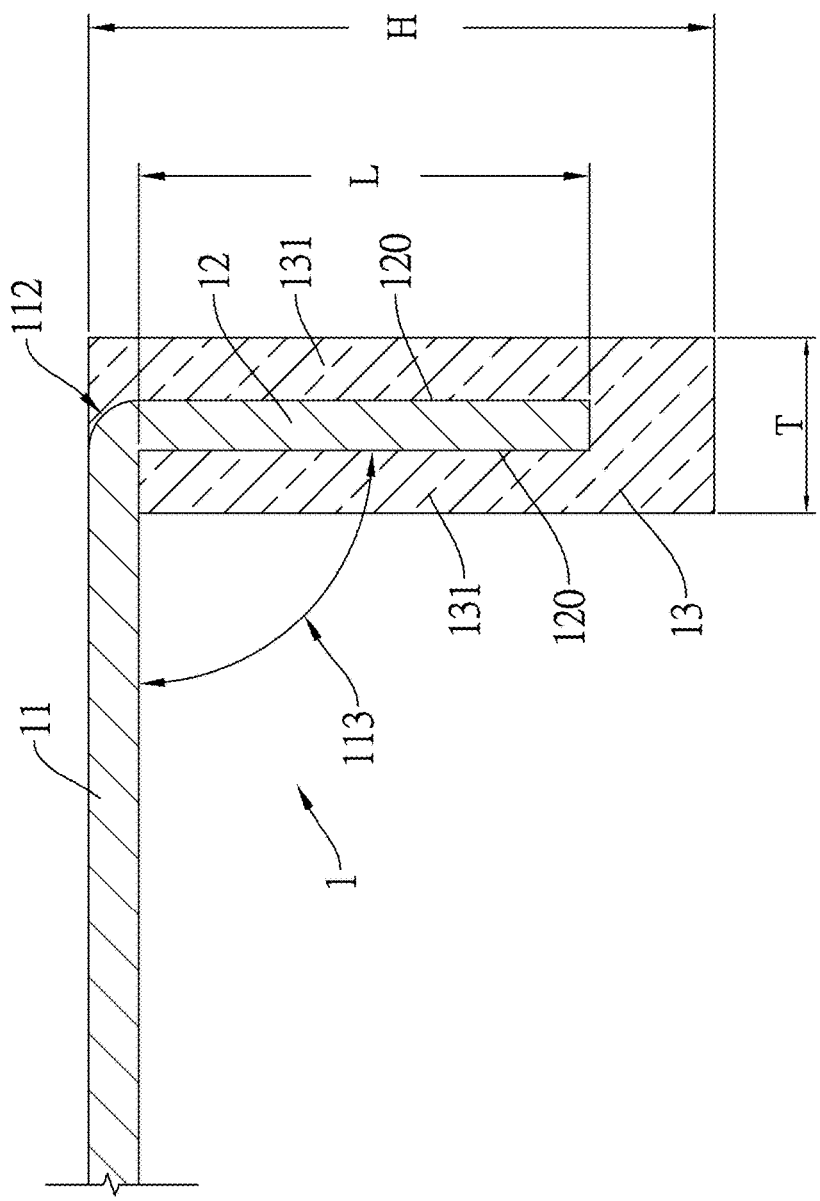
FIG. 4 shows a planar view of one side of the entire structure in accordance with the first preferred embodiment of the display device frame of the present invention.
Figure 5:
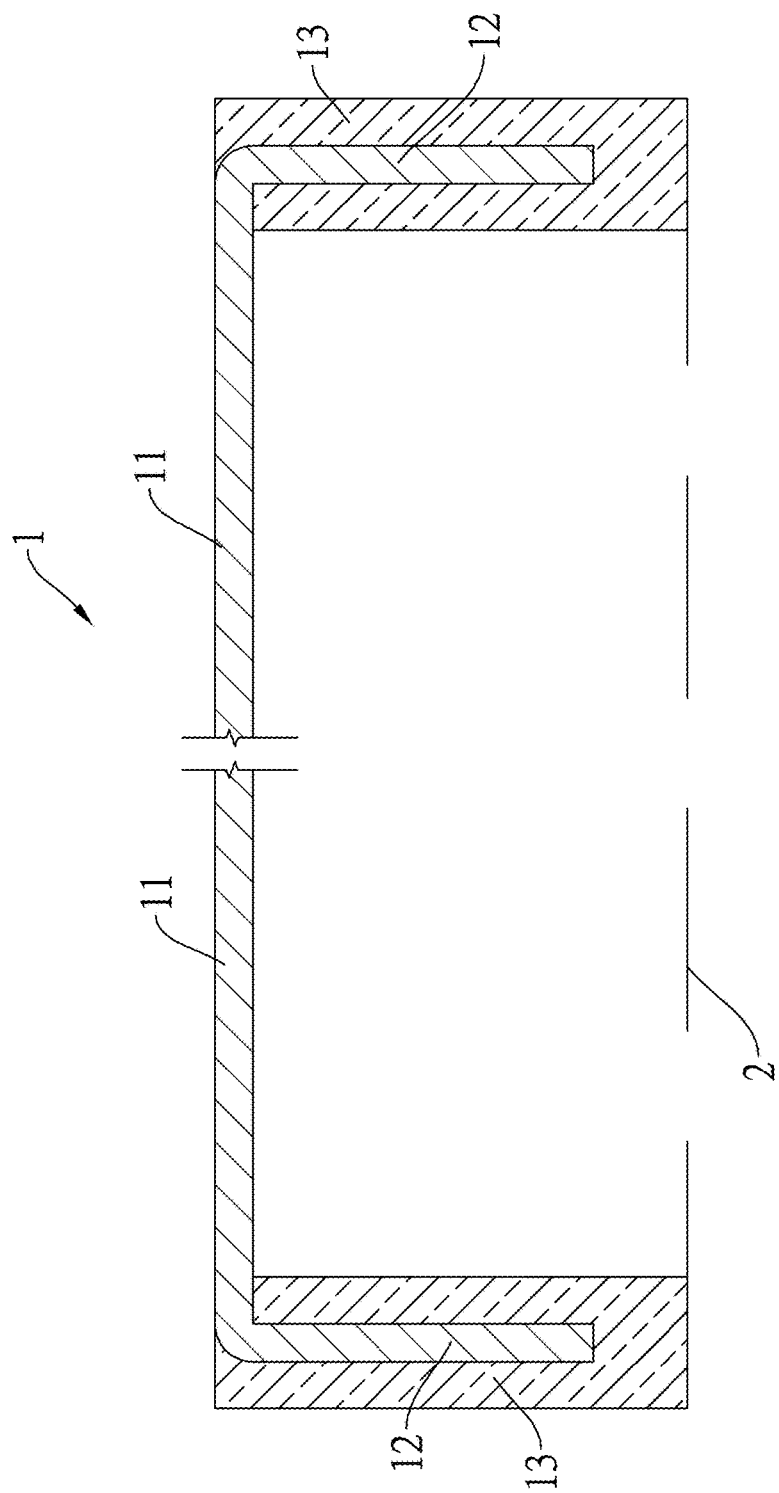
FIG. 5 shows a three-dimensional view of two sides of the entire structure in accordance with the first preferred embodiment the display device frame of the present invention.

First of all, referring to FIGS. 3 to 5, it shows a three-dimensional view of one side of a metallic back panel, a planar view of one side of the entire structure and a three-dimensional view of two sides of the entire structure, in accordance with a first preferred embodiment of a display device frame of the present invention. The display device frame 1, according to the present invention, comprises at least a metallic back panel 11 and a plastic outer frame 13, wherein a side of the metallic back panel 11 is extended with a lateral edge 12 which is provided with two side surfaces 120. The metallic back panel 11 is formed integrally with the lateral edge 12, and the plastic outer frame 13 encloses the lateral edge 12. The lateral edge 12 is provided with an extended length L, the plastic outer frame 13 is provided with a thickness T and a height H, and an included angle 113 is formed between an inner side of the metallic back panel 11 and an inner side of the lateral edge 12; whereas an outer side of the metallic back panel 11 and an outer side of the lateral edge 12 form a bended corner 112. The included angle 113 can be an obtuse angle, a right angle or an acute angle. The type of right angle for the included angle 113 facilitates the plastic outer frame 13 to enclose the lateral edge 12 by insert molding, the type of acute angle for the included angle 113 allows a back light module 2 to be sustained with a larger clipping force, and the type of obtuse angle for the included angle 113 enables the accommodation of a larger back light module 2. The metallic back panel 11 is made of a metallic material and the plastic outer frame 13 is made of a plastic material. The bended corner 112 can be a sharp edge or an arc. It is preferred that the plastic outer frame 13 encloses the two side surfaces 120 of the lateral edge 12, meaning that two clip parts 131 of the plastic outer frame 13 are in a clipping state to clip exactly the lateral edge 12 and the two side surfaces 120 of the lateral edge 12. Therefore, there is no need to perform a special surface treatment in advance, such as anodizing or surface roughening, on the surfaces of the metallic back panel 11 and the lateral edge 12 which are made of metal, that the plastic outer frame 13 made of plastic and the lateral edge 12 made of metal can be combined tightly. It is definitely the most preferred that the plastic outer frame 13 encloses completely the two side surfaces 120 of the lateral edge 12 and the two clip parts 131 of the plastic outer frame 13 are in a clipping state to clip exactly the lateral edge 12 and the two side surfaces 120 of the lateral edge 12.

Figure 1:
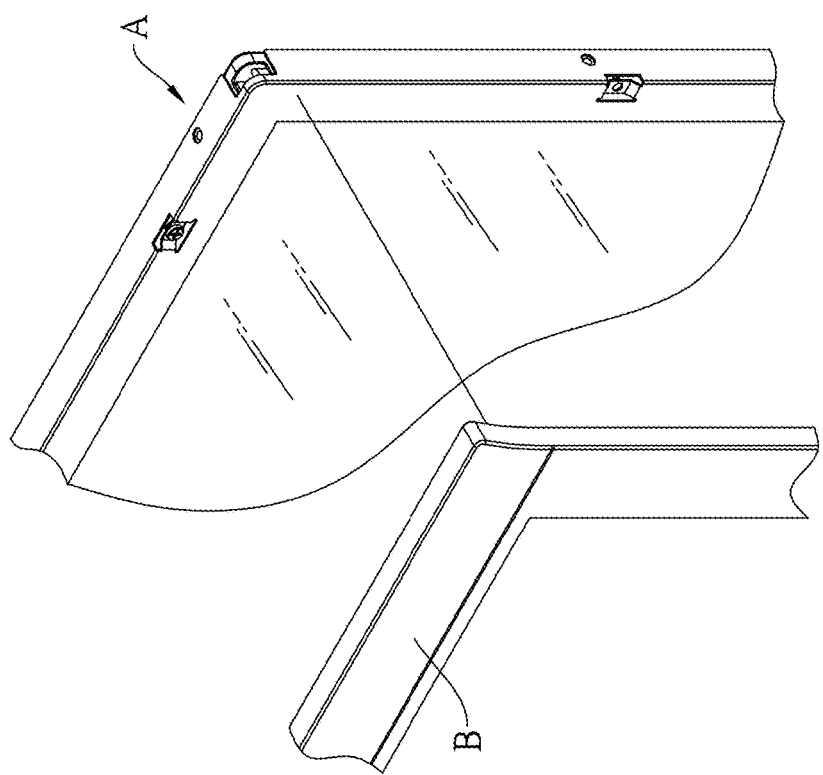
FIG. 1 shows a three-dimensional view of a frame of a conventional display device.
Figure 2:
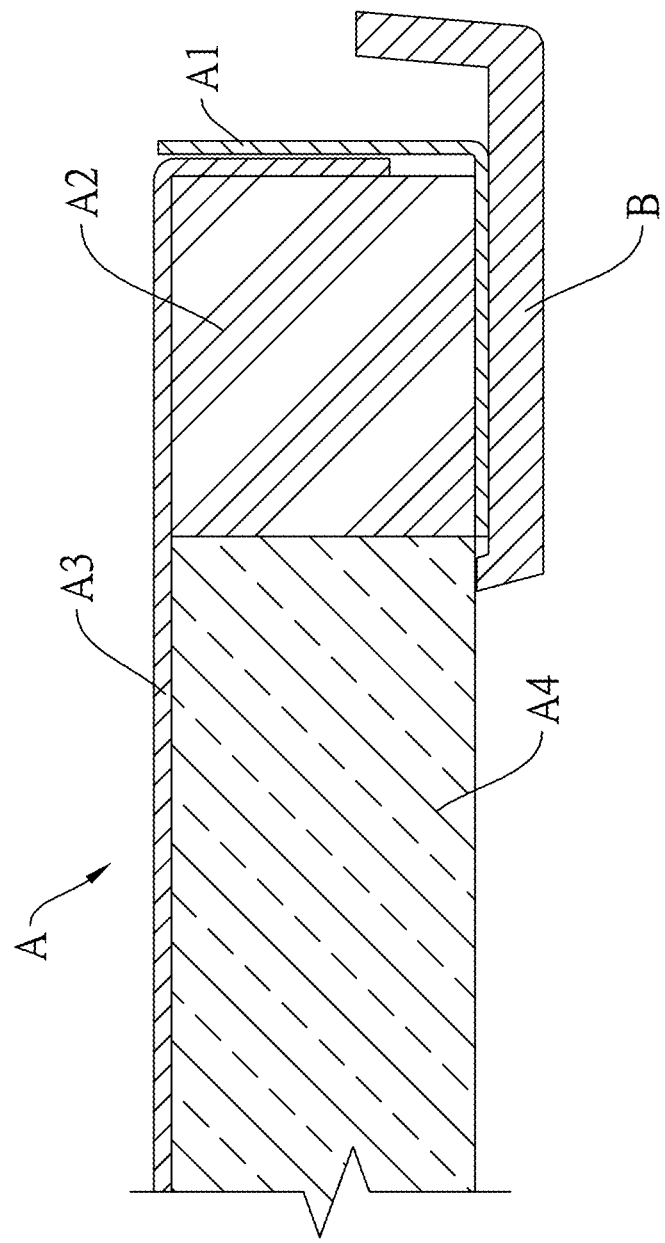
FIG. 2 shows a planar view of the frame of a conventional display device.

In a first embodiment of the present invention, the display device frame 1 includes the metallic back panel 11 which is made of metal, wherein two sides of the metallic back panel 11 are extended vertically and respectively with a lateral edge 12, each lateral edge 12 is formed integrally with the metallic back panel 11, and the lateral edge 12 is provided with an extended length L larger than 1 mm. The plastic outer frame 13 which is made of plastic encloses the lateral edges 12 by insert molding, and the thickness T of the plastic outer frame 13 is smaller than 0.6 mm. Please refer to FIG. 5 again. After the plastic outer frame 13 is formed on each lateral edge 12 at two sides of the metallic back panel 11, a back light module 2 can be disposed between the lateral edges 12 which are enclosed by the plastic outer frame 13, thereby effectively achieving a display device frame 1 that is simple in structure and space, without requiring the front frame A1 in the prior art as shown in FIG. 2. In the present embodiment, each side of the metallic back panel 11 is extended vertically with a lateral edge 12, and thus, the included angle 113 is 90°. In addition, the bended corner 112 is an arc to prevent an operator from being cut. It is definitely that the extended length L and the height H of the plastic outer frame 13 can be pre-determined according to the thickness of the back light module 2.

However, it is to be noted that the manufacturing process and the structure of the back light module 2 are common knowledges in the prior art and are not the main focuses in the present invention, which will not be described further in the present invention.

Figure 6:
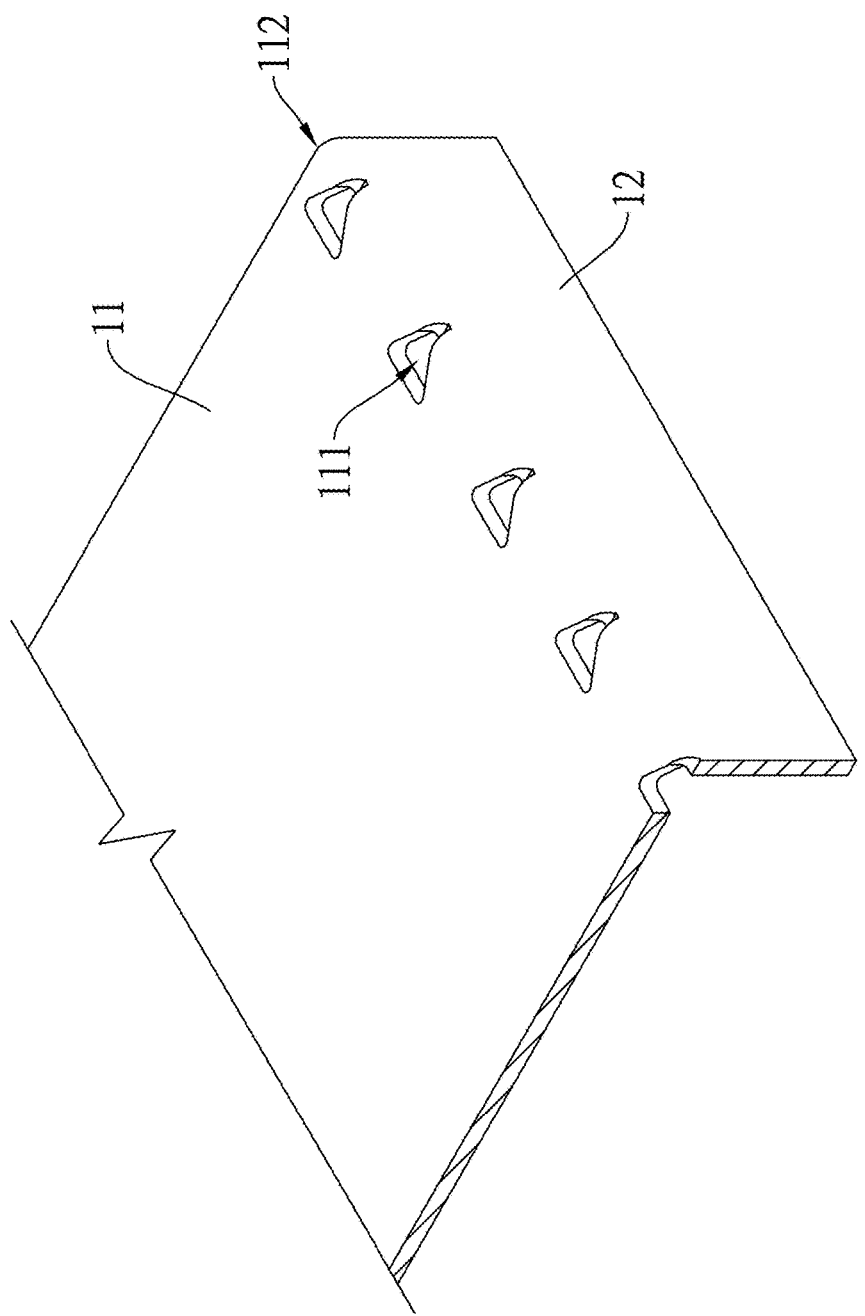
FIG. 6 shows a three-dimensional view of one side of the metallic back panel in accordance with a second preferred embodiment of the display device frame of the present invention.
Figure 7:
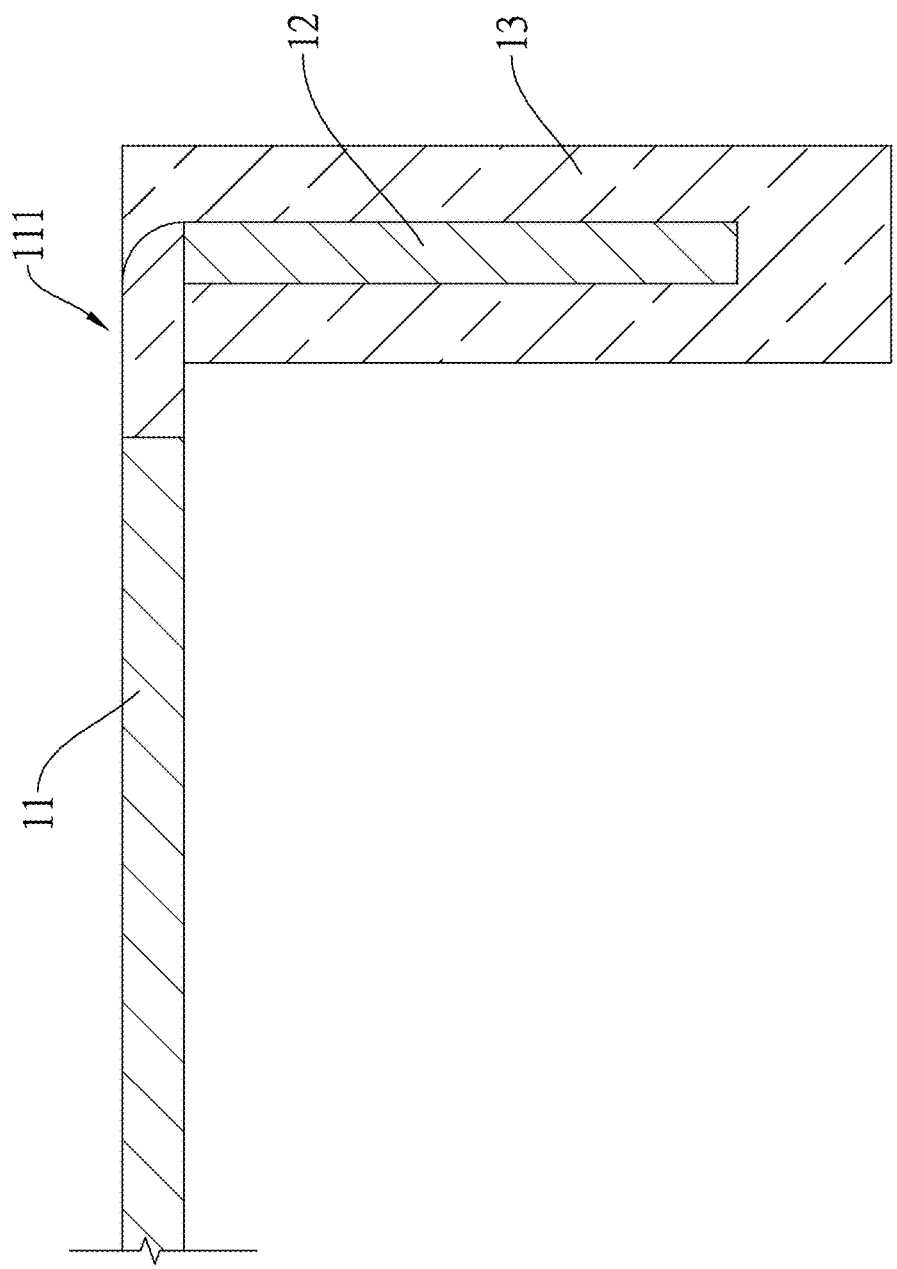
FIG. 7 shows a planar view of one side of the entire structure in accordance with the second preferred embodiment of the display device frame of the present invention.

Referring to FIG. 6 and FIG. 7 together, it shows a three-dimensional view of one side of the metallic back panel and a planar view of one side of the entire structure, in accordance with a second preferred embodiment of the display device frame of the present invention. At least a metallic back panel hole 111 is further opened on the metallic back panel 11 in adjacent to the bended corner 112 or at the bended corner 112; whereas, the plastic outer frame 13 penetrates and fills the metallic back panel holes 111. Therefore, the plastic outer frame 13, the metallic back panel 11 and the lateral edge 12 are combined more tightly, which prevents the plastic outer frame 13, the lateral edge 12 and the metallic back panel 11 from separating from the bended corner 112. The metallic back panel holes 111 are in a triangular shape, a square shape, a round shape or any shape. In the embodiment as shown in FIG. 6 and FIG. 7, plural triangular metallic back panel holes 111 are opened on the bended corner 112 where the metallic back panel 11 is connected with the lateral edge 12. The metallic back panel holes 111 enable the plastic outer frame 13 to be combined more tightly with the lateral edge 12 and the metallic back panel 11. As the plastic outer frame 13 penetrates and fills the metallic back panel holes 111, there is no need to perform a special surface treatment in advance, such as anodizing or surface roughening, on the surface of the metallic back panel 11 and the surface of the lateral edge 12, that the plastic outer frame 13, the lateral edge 12 and the metallic back panel 11 can be combined tightly.

Figure 8:
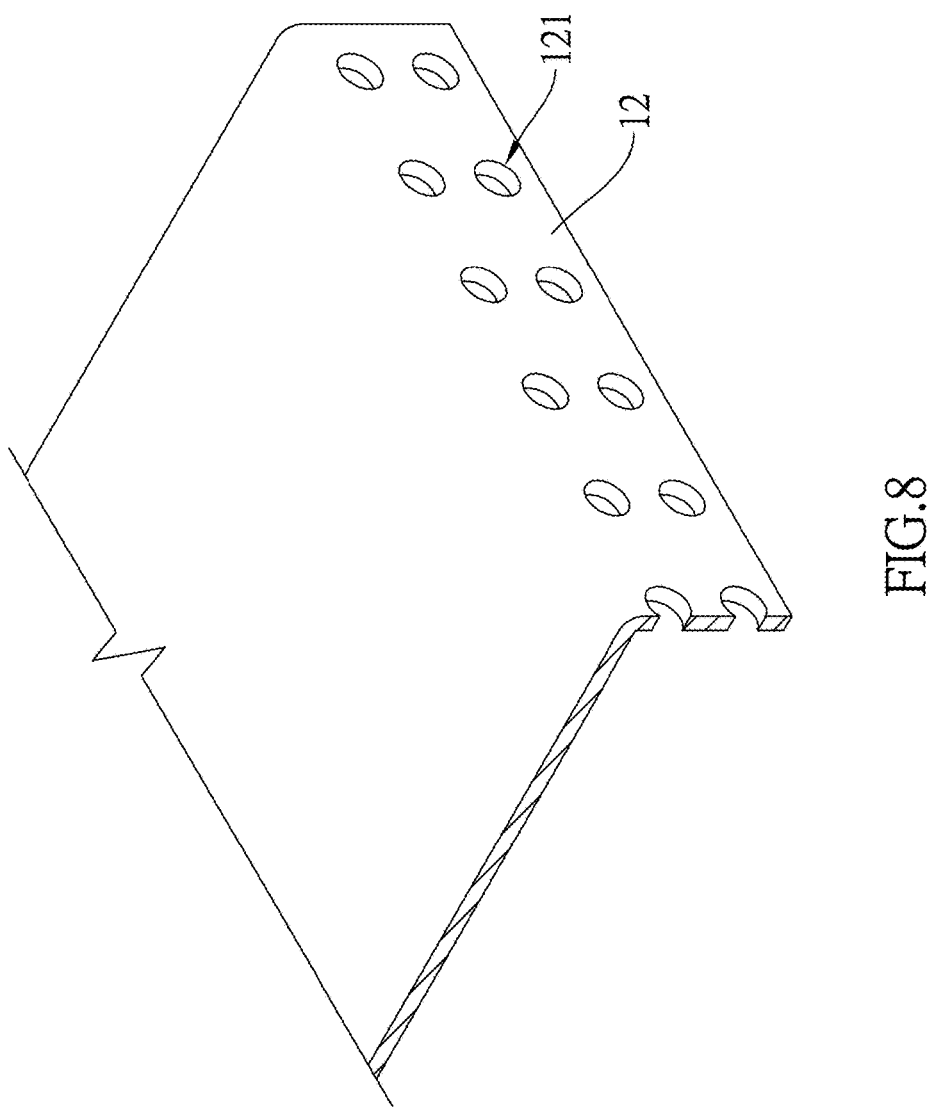
FIG. 8 shows a three-dimensional view of one side of the metallic back panel in accordance with a third preferred embodiment of the display device frame of the present invention.
Figure 9:
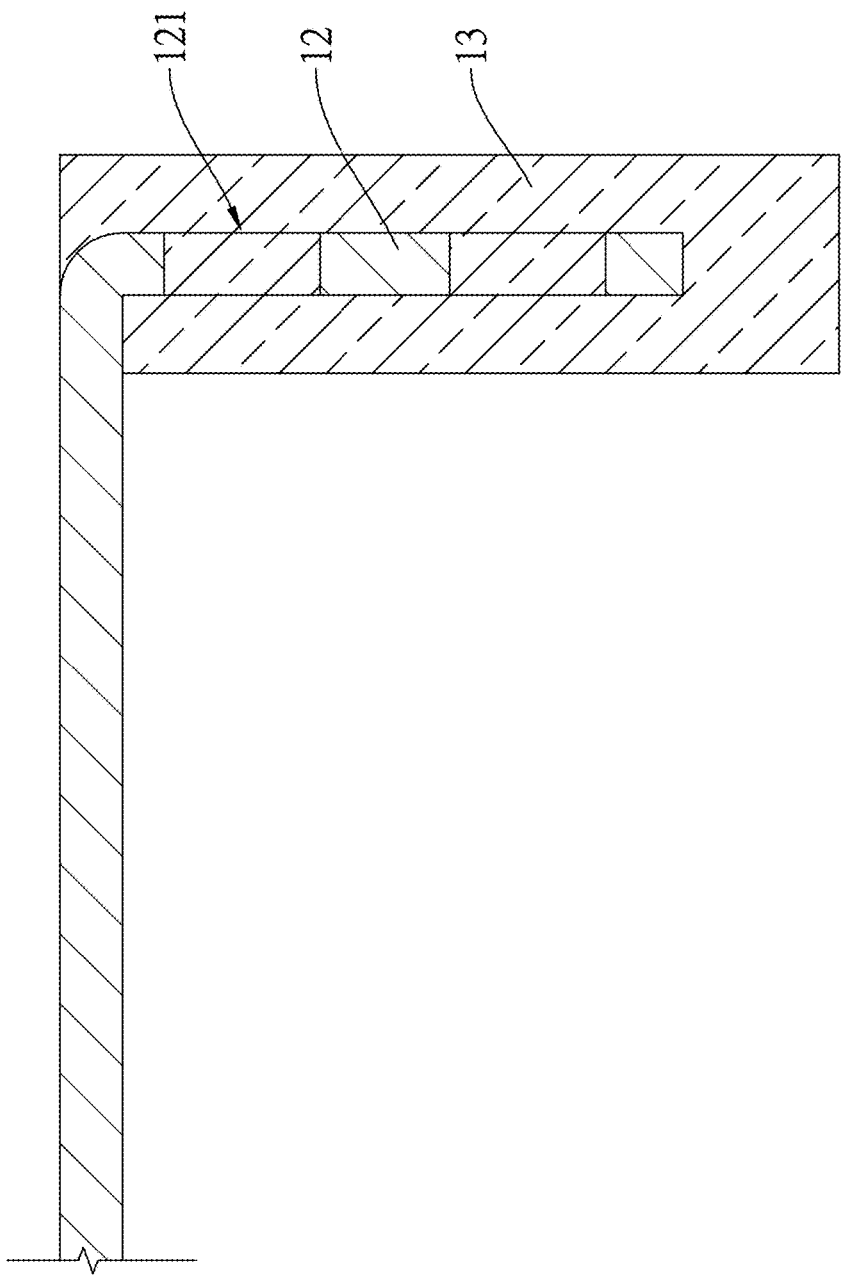
FIG. 9 shows a planar view of one side of the entire structure in accordance with the third preferred embodiment of the display device frame of the present invention.

Referring to FIG. 8 and FIG. 9 together, it shows a three-dimensional view of one side of the metallic back panel and a planar view of one side of the entire structure, in accordance with a third preferred embodiment of the display device frame of the present invention. The lateral edge 12 can be further opened with at least a lateral edge hole 121 which is in a round shape, a triangular shape, a square shape or any shape. In the embodiment as shown in FIG. 8 and FIG. 9, the lateral edge 12 is opened with plural lateral edge holes 121 which are in a round shape and are arranged up and down. The diameter of the lateral edge hole 121 is larger than 0.6 mm and the distance between every two lateral edge holes 121 is larger than 10 mm. The plastic outer frame 13 penetrates and fills the lateral edge holes 121. Therefore, the plastic outer frame 13 and the lateral edge 12 can be combined more tightly, which prevents the plastic outer frame 13 and the lateral edge 12 from separating with each other. As the plastic outer frame 13 penetrates and fills the lateral edge holes 121, there is no need to perform a special surface treatment in advance, such as anodizing or surface roughening, on the surface of the metallic back panel 11 and the surface of the lateral edge 12, that the plastic outer frame 13 and the lateral edge 12 can be combined tightly.

Figure 10:
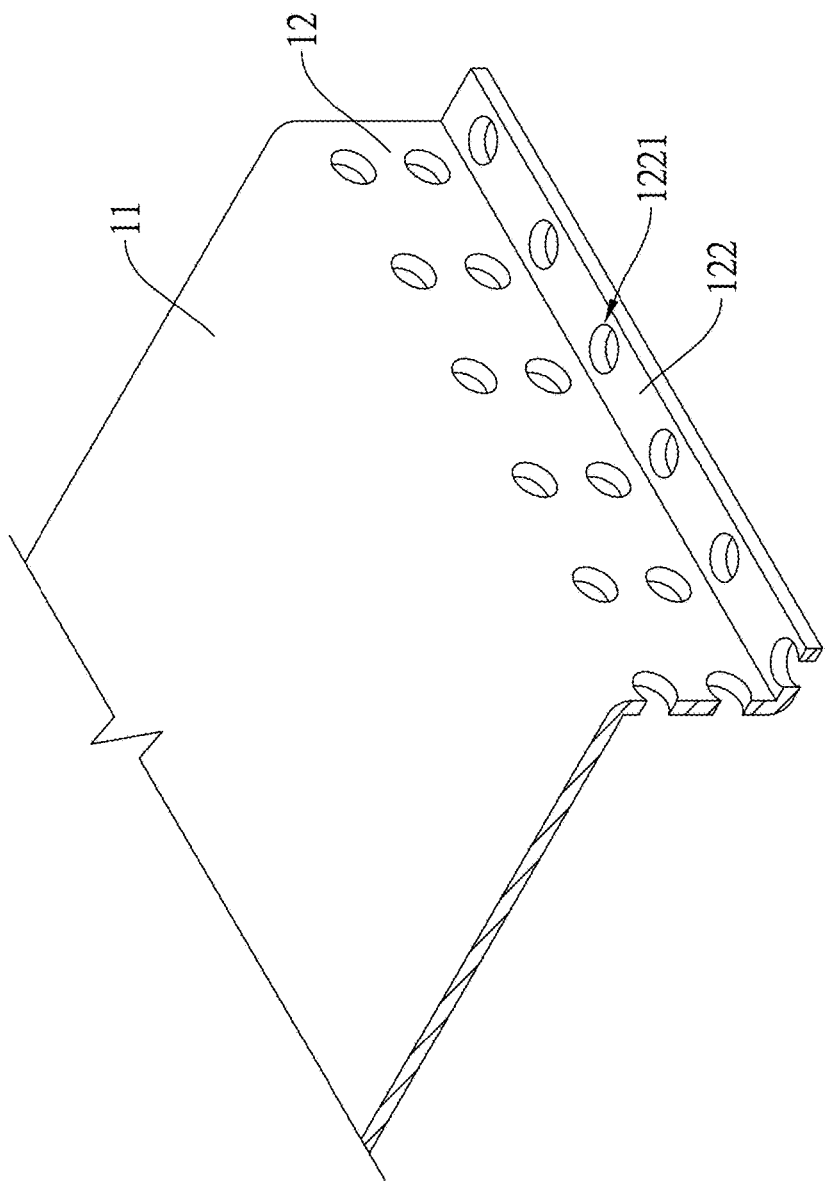
FIG. 10 shows a three-dimensional view of one side of the metallic back panel in accordance with a fourth preferred embodiment of the display device frame of the present invention.
Figure 11:
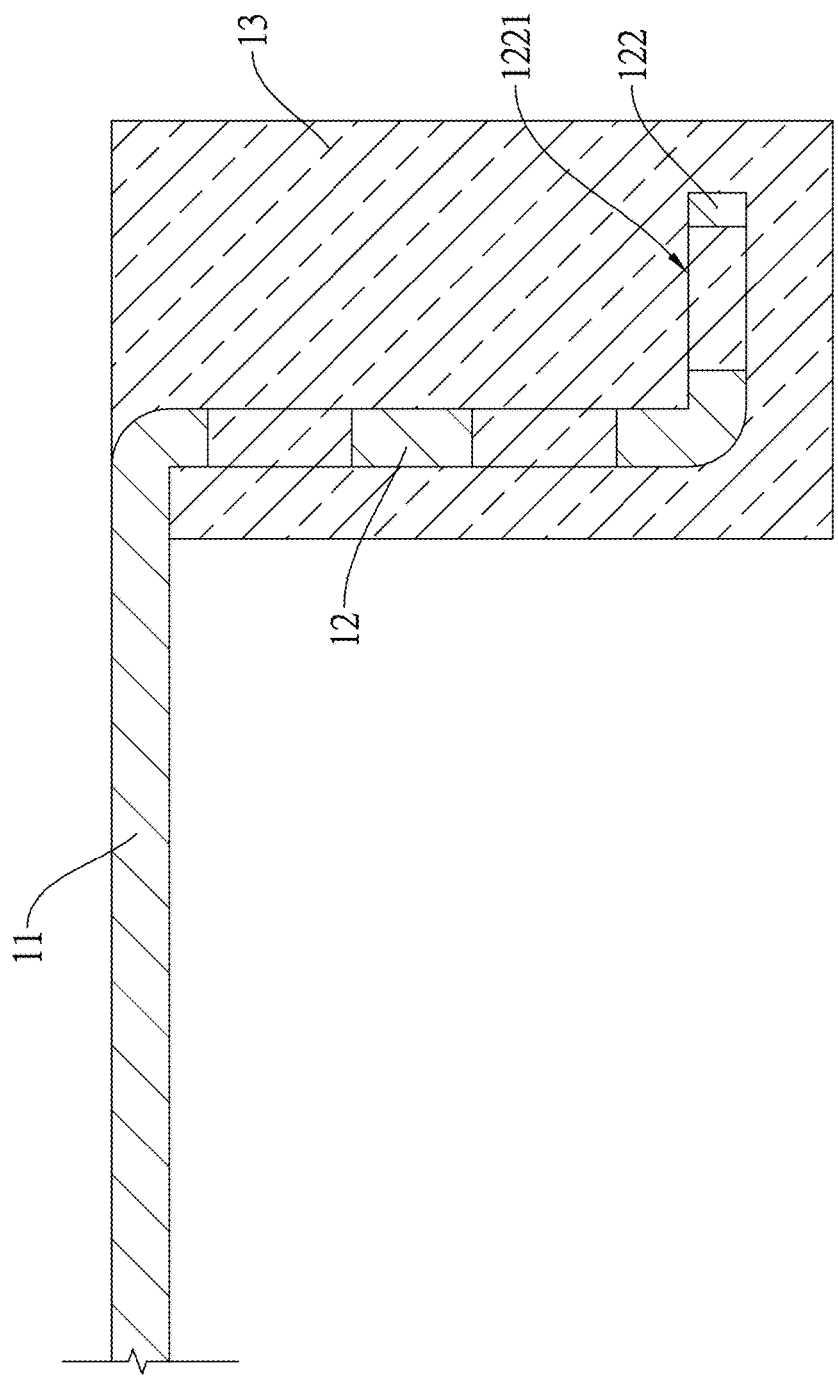
FIG. 11 shows a planar view of one side of the entire structure in accordance with the fourth preferred embodiment of the display device frame of the present invention.

Referring to FIG. 10 and FIG. 11 together, it shows a three-dimensional view of one side of the metallic back panel and a planar view of one side of the entire structure, in accordance with a fourth preferred embodiment of the display device frame of the present invention. A bottom of the lateral edge 12 can be further extended outward with a flank 122 which is parallel with the metallic back panel 11, wherein the extended length of the flank 122 is larger than 1 mm. Moreover, the flank 122 can be further opened with at least a flank hole 1221 which is in a round shape, a triangular shape, a square shape or any shape. In the embodiment as shown in FIG. 10 and FIG. 11, the bottom of the lateral edge 12 is extended outward with the flank 122 which is parallel with the metallic back panel 11 and is provided with the extended length larger than 1 mm. The flank 122 is opened with plural round-shaped flank holes 1221, the diameter of the flank hole 1221 is larger than 0.6 mm and the distance between every two flank holes 1221 is larger than 10 mm. The plastic outer frame 13 penetrates and fills the flank holes 1221. Therefore, the plastic outer frame 13 and the lateral edge 12 can be combined together more tightly, which means that the flank holes 1221 enables the plastic outer frame 13 to be combined more tightly with the lateral edge 12.

Figure 12:
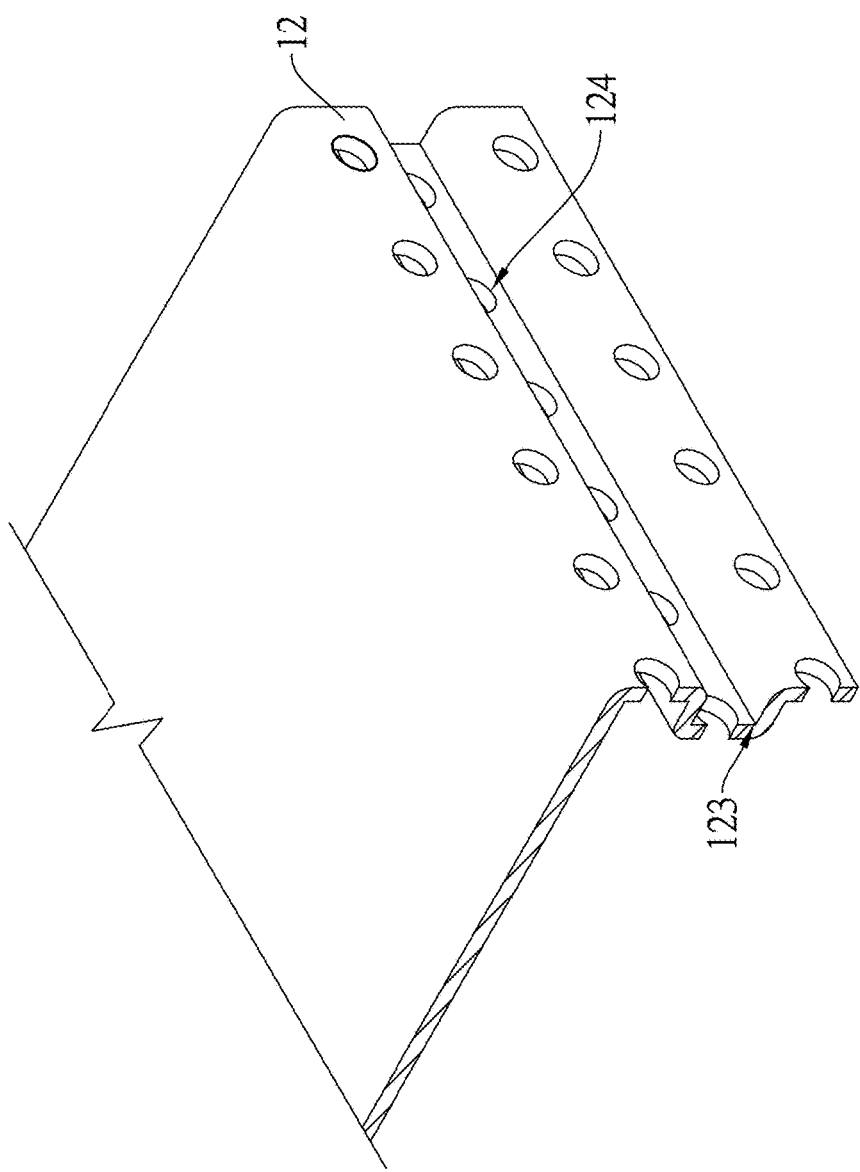
FIG. 12 shows a three-dimensional view of one side of the metallic back panel in accordance with a fifth preferred embodiment of the display device frame of the present invention.
Figure 13:
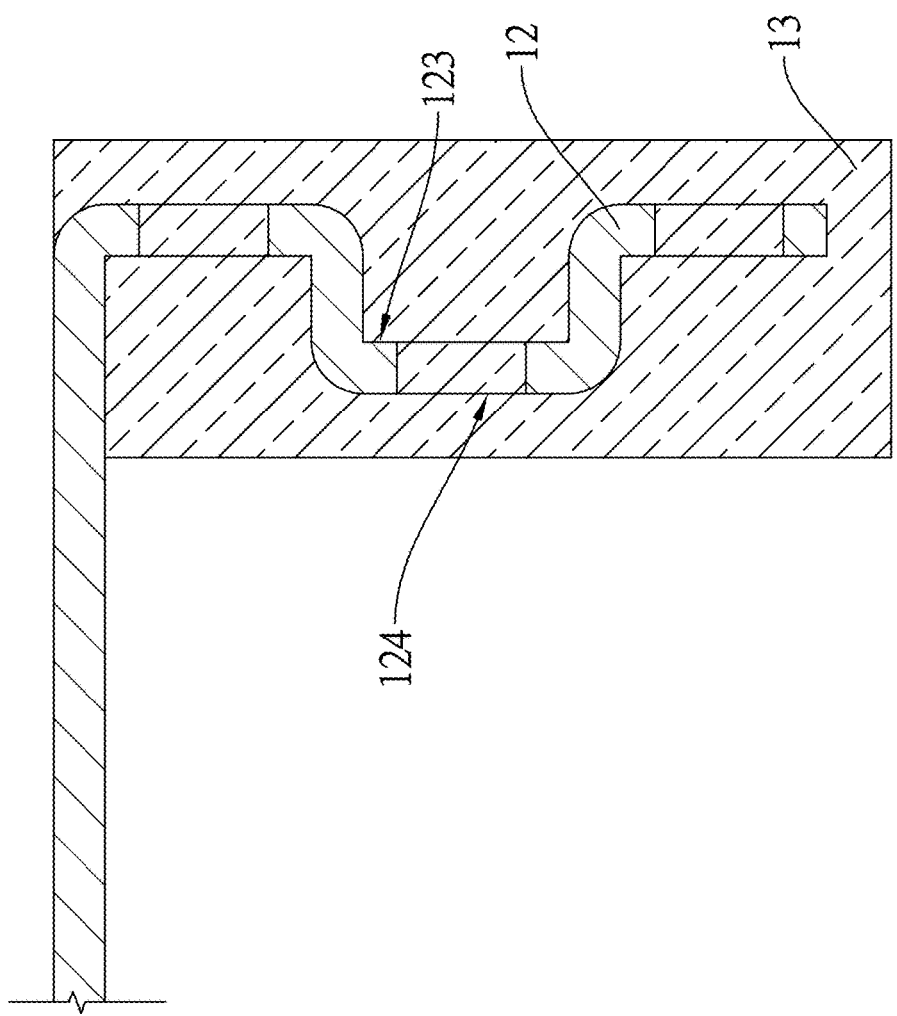
FIG. 13 shows a planar view of one side of the entire structure in accordance with the fifth preferred embodiment of the display device frame of the present invention.
Figure 14:
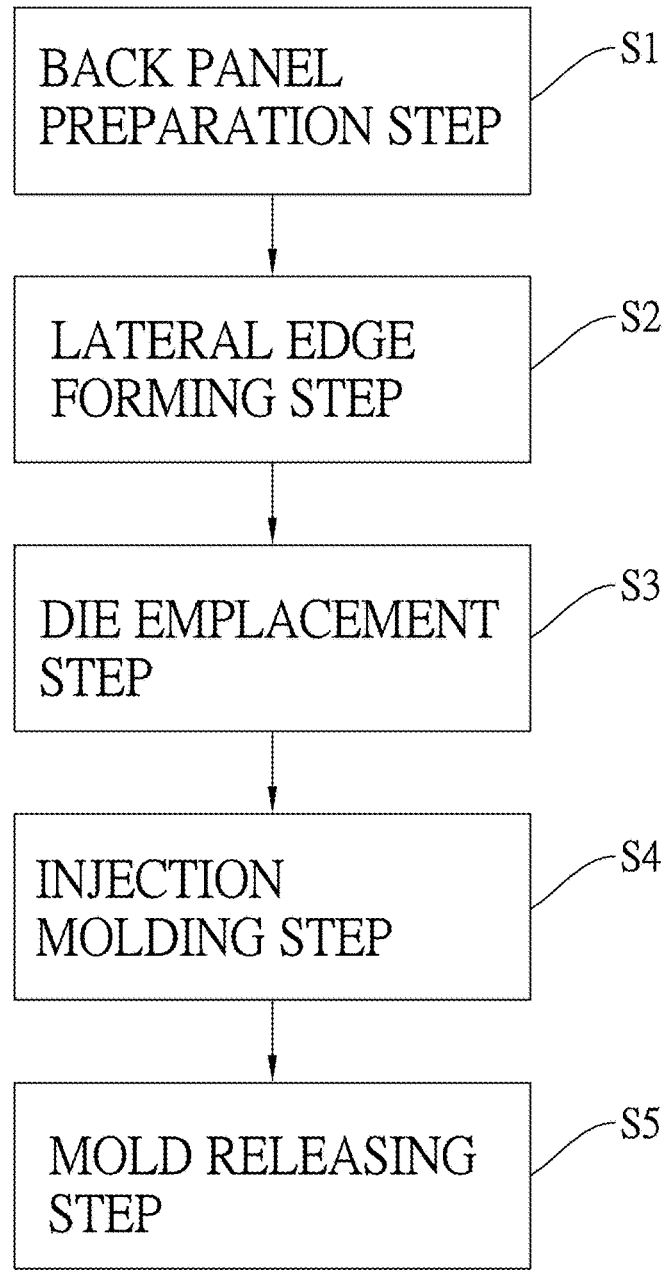
FIG. 14 shows a flow diagram of operation of a manufacturing method of the display device frame of the present invention.

Referring to FIG. 12 and FIG. 13 together, it shows a three-dimensional view of one side of the metallic back panel and a planar view of one side of the entire structure, in accordance with a fifth preferred embodiment of the display device frame of the present invention. The lateral edge 12 includes a groove 123 which is indented inward. The groove 123 allows the lateral edge 12 to contact with the plastic outer frame 13 by a larger area, and the design of the groove 123 of the lateral edge 12 enables the plastic outer frame 13 to keep combining with the lateral edge 12 tightly upon being subjected to an external force from any direction. A bottom of the groove 123 is opened at least with a groove hole 124, whereas the plastic outer frame 13 penetrates and the fills the groove holes 124. The groove holes 124 enable the plastic outer frame 13 to be combined more tightly with the lateral edge 12.

Next, referring to FIGS. 3 to 5 and FIG. 14 which shows a flow diagram of operation of a manufacturing method of the display device frame of the present invention, in order to achieve the implementation object of the abovementioned display device frame 1, a manufacturing method of the display device frame is disclosed, including at least following steps.

Back Panel Preparation Step (S1)

The abovementioned back panel 11 is prepared from a metallic material.

Lateral Edge Forming Step (S2)

Each of the two sides of the metallic back panel 11 is bended along a same direction and extended vertically with the lateral edge 12, and the metallic back panel 11 is formed integrally with the lateral edges 12.

Die Emplacement Step (S3)

The metallic back panel 11 is fed into a mold cavity (not shown in the drawings) in a die of plastic injection molding (not shown in the drawings), and the lateral edges 12 are put into the mold cavity.

Injection Molding Step (S4)

A molten plastic material is put into the mold cavity in the die of the injection molding and is combined with the lateral edges 12, with that the molten plastic material forms the plastic outer frame 13 to enclose the lateral edges 12.

Mold Releasing Step (S5)

The die of plastic injection molding is opened to release the mold, forming the abovementioned display device frame 1.

By the abovementioned embodiments, the display device frame and the manufacturing method thereof, in accordance with the present invention, are provided with following advantages in comparison with the exiting technology and products.

The display device frame according to the present invention is formed by plastic injection molding, wherein a right angle side of a metallic back panel is enclosed by a plastic outer frame, and the method of combining plastic with metal is used effectively to form a frame of a large liquid crystal display device, such as a liquid crystal display device or an LED (Light Emitting Diode) display device in a size larger than 19". The present invention removes the front frame in the conventional large display device frame and uses effectively a metallic material to support, such that the plastic material can enclose the periphery or a part of the large display device to achieve the trends and advantages of thinning the large display device. In addition, by using the insert molding method in which plastic encloses a metal part, no extra work procedures will be needed, which saves the assembling cost of the large display device and actually achieves the benefits of saving the assembling procedure, cost and time of the large display device to realize the advantages of lightness, simpleness and thinning of the large display device.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A frame structure for a display device comprising:
   a metallic back panel having a lateral edge extended from a side of the metallic back panel; and
   a plastic outer frame having two clip parts,
   wherein the lateral edge is provided with two side surfaces, the lateral edge is formed integrally with the metallic back panel; an included angle is formed between an inner side of the metallic back panel and an inner side of the lateral edge; a bended corner is formed between an outer side of the metallic back panel and an outer side of the lateral edge, and the bended corner is in a shape of an arc; the plastic outer frame completely encloses the two side surfaces of the lateral edge, the included angle, and the bended corner by injection molding and the two clip parts are in a clipping state to clip the two side surfaces, the included angle, and the bended corner.

2. The frame structure for a display device according to claim 1, wherein the included angle is an obtuse angle, a right angle or an acute angle.

3. The frame structure for a display device according to claim 1, wherein the included angle is a right angle.

4. The display device frame according to claim 1, wherein an outer side of the metallic back panel and an outer side of the lateral edge form a bended corner, a metallic back panel hole is located on the metallic back panel in adjacent to the bended corner or at the bended corner, whereas the plastic outer frame penetrates and fills the metallic back panel hole.

5. The display device frame according to claim 1, wherein the lateral edge is provided with a lateral edge hole, whereas the plastic outer frame penetrates and fills the lateral edge hole.

6. The display device frame according to claim 1, wherein a bottom of the lateral edge is extended outward with a flank.

7. The display device frame according to claim 6, wherein the flank is provided with a flank hole, whereas the plastic outer frame penetrates and fills the flank hole.

8. The display device frame according to claim 1, wherein the lateral edge includes a groove, and the plastic outer frame fills the groove.

9. The display device frame according to claim 8, wherein a bottom of the groove is opened with a groove hole, whereas the plastic outer frame penetrates and fills the groove hole.

* * * * *